Jan. 10, 1939.  E. L. WILLITS  2,143,340
GAS OPERATED SIGNAL FOR SECONDARY BATTERIES
Filed March 11, 1937
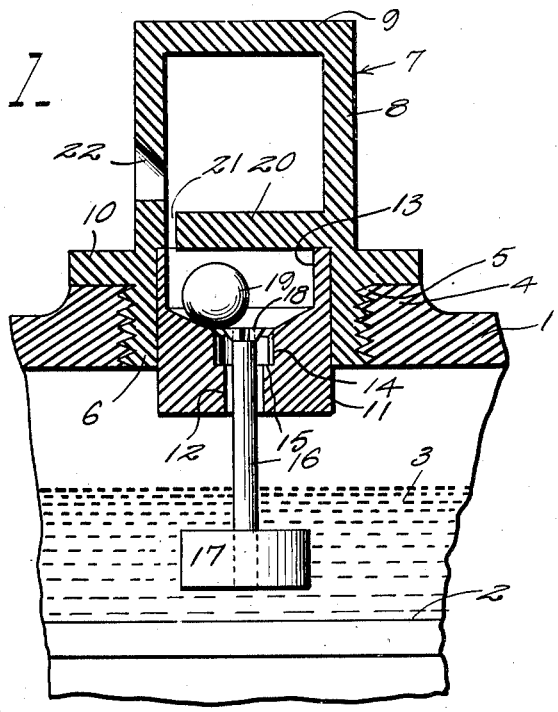
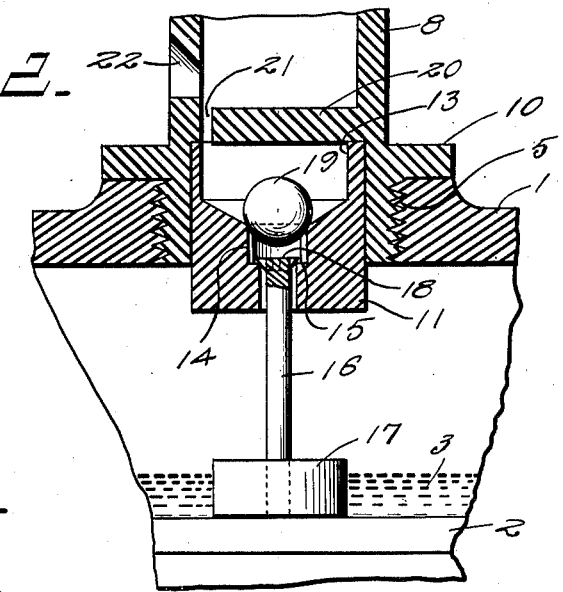
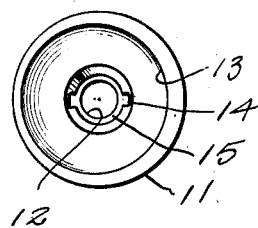
Inventor
E. L. Willits
By Watson E. Coleman
Attorney Patented Jan. 10, 1939

2,143,340

UNITED STATES PATENT OFFICE 2,143,340

GAS OPERATED SIGNAL FOR SECONDARY BATTERIES

Elton L. Willits, Atlantic City, N. J.

Application March 11, 1937, Serial No. 130,378

7 Claims. (Cl. 136—182)

This invention relates generally to the class of secondary batteries and pertains particularly to a signal or indicating device designed to give warning when either the level of the electrolyte solution in the battery or the specific gravity thereof decreases beyond a safe point.

The present invention has for its primary object to provide an audible indicator for secondary or storage batteries which is designed to take the place of the usual cap employed for closing the water opening of the battery cell and which will give a warning signal when the electrolyte in the cell goes down by reason of the evaporation of the moisture content thereof, to a dangerously low level or when the specific gravity of the same drops below a safe point.

Another object of the invention is to provide a signal device for secondary batteries which is operated by gases developed in the battery cell when the same is receiving a charging current, when the level of the electrolyte drops below a desired point or the specific gravity of the same decreases to a dangerous extent, so that an audible warning will be intermittently given by the gases as they escape from the cell, that a condition dangerous to the cell exists therein.

Still another object of the invention is to provide a signal device of the character described which is maintained inoperative so long as the electrolyte level of the cell is at the proper height and the specific gravity thereof is at the same time above a certain point, through the medium of a float device which is supported by the electrolyte and which prevents the giving of a signal by the gases developed in and escaping from the cell.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes mark no material departure from the salient features of the invention as expressed in the appended claims.

In the drawing:

Figure 1 is a view in vertical section through the device embodying my construction, showing the same in normal position.

Figure 2 is a view showing the device in signalling position.

Figure 3 is a top plan view of the valve ball carrying unit of the device.

Referring now more particularly to the drawing, the numeral 1 generally designates the top or cover portion of a cell of a secondary or storage battery, while the numeral 2 designates the upper edge of a battery plate and generally indicates the plane of the top surfaces of the battery plates and separators. In Figure 1, the electrolyte in the cell is shown to be at a high level as it should be normally maintained and, when it has the proper specific gravity, it will maintain a movable element of the indicator in raised position, as hereinafter described. The electrolyte is indicated by the numeral 3.

The top 1 of the cell is provided with the usual cone portion 4 through which the filling opening is formed and this opening is threaded, as indicated at 5, to receive the threaded cylindrical lower portion 6 of the unit indicated generally by the numeral 7, which constitutes the device embodying the present invention. This device 7 comprises a relatively long cylindrical body 8 which is closed at one end, as indicated at 9, and which constitutes the top and which is encircled at the inner end of the threaded portion 6, by the flange 10. This flange serves the double purpose of facilitating the rotation of the threaded portion when the same is inserted into or removed from the threaded opening of the cone 4 and limiting the inward movement of this portion when the device is placed in position.

Secured in the open inner end of the tubular body 8 is a plug 11 which has a central passage 12 formed therethrough and which at its upper end opens into the sump or pocket 13 which is directed upwardly toward the interior of the body 8. The floor of the sump 13 is inclined toward the center or toward the passage 12 which opens through the central part thereof and extending downwardly from this floor are grooves 14 which are formed in the side of the passage 12. The passage 12 is of slightly enlarged diameter through a portion of its length and extending from the upper end thereof so as to form an interior shoulder 15 and the groove or grooves 14 extend downwardly only as far as this shoulder.

Extending upwardly through the passage 12 is a float stem 16, the lower end of which is attached to the float 17 while the upper end has the flared head portion 18 which moves in the enlarged upper end of the passage 12 and is limited in its downward movement by the shoulder 15.

The pocket or sump 13 contains the metal ball 19 which, when the float is down so that the flared head portion 18 is disposed below the top end of the passage 12, will enter the passage and close the same in the manner illustrated in Figure 2.

Disposed across the interior of the body 8 above the pocket 13 is a partitioning body 20 which at one side is spaced slightly from the wall of the cylinder 8, forming the gas escape passage or throat 21 and immediately adjacent this throat the wall of the cylinder is provided with the escape aperture 22 for the gases. The relative positions of the throat and gas escape aperture are such that a volume of gas passing upwardly through the throat will form a whistling sound in passing outwardly through the aperture 22 so that the desired signal will be obtained.

In the operation of the device, when the battery cell is properly filled with electrolyte and the specific gravity of the same is above 1.215, the float 17 will be maintained raised in the manner illustrated in Figure 1 and will maintain the ball 19 at one side of the upper end of the passage 12, so that gases generated within the cell can pass upwardly through the passage and escape by way of the grooves 14 into the upper part of the device and pass outwardly through the opening 22. Such gases, however, will not produce the signalling whistle in passing through the opening 22, because of the fact that they are so slowly generated that there will not be sufficient pressure behind them to produce the whistling action. However, if the level of the electrolyte is reduced, as illustrated in Figure 2, or if the specific gravity falls below 1.215 while the electrolyte level is at the upper height so that it will not maintain the float 17 in raised position, the float will drop so as to draw the head portion 15 into the lower part of the enlarged upper end of the passage 12 and the ball 19 will thus gravitate to the center of the sump and close the upper end of the passage. The ball thus acts as a valve stopping temporarily the escape of gases which will be generated within the cell while the battery is receiving a charging current until the pressure of the gas has become great enough to blow past the ball and when this occurs, there will be sufficient rush of the gases through the throat 21 and out of the opening 22 to produce the desired signalling whistle. Naturally as soon as the gases have rushed past the ball 19, the latter will roll back and again close the passage until sufficient gas pressure is built up in the cell to repeat the operation and thus there will be given an intermittent whistling signal which will warn the owner of the battery that the same needs attention.

The ball 19 will be formed of some suitable non-corroding metal and the other parts of suitable non-corroding material, the float being composed of a suitable substance which will float in but be unaffected by the electrolyte and the size of the float will be governed, of course, by the material and the amount of the same necessary to be lifted by an electrolyte having a specific gravity greater than that given above.

What is claimed is:

1. In a storage battery having a cell having a top wall provided with the usual screw-plug closed filling opening, a signaling element comprising a body designed for insertion in said opening in replacement of said plug, means providing for the escape thru the body of gases developed in the cell during charging thereof, means for intermittently obstructing said escape means, means controlled by the cell electrolyte for maintaining said escape means unobstructed while the cell electrolyte is at a correct level and above a specified specific gravity, and means for effecting the production of a signal by the gases passing thru said escape means when an undesirable condition develops in regard to the electrolyte and said obstructing means is alternately closing and opening said escape means.

2. In a secondary battery having a cell provided with a top wall having a plug closed filling opening, a body insertable in said filling opening and having an escape passage therethrough for gases developed in the cell while the same is receiving a charging current, a float element, a stem carried by the element and having one end extended into said passage for limited movement therein, a freely movable element in the passage and adapted to close the same when said stem is moved in one direction to have said end in a predetermined position in the passage, said stem being attached to said float and, when raised with the float by the electrolyte in the cell, shifting said freely movable element to open the passage, and means whereby gases escaping past said movable element as a result of built-up pressure in the cell, when the element is in passage closing position, will effect the production of an audible signal.

3. In an electrolyte containing storage battery having a cell provided with a top wall having a filling opening therethrough, a closure body for the filling opening having a chamber in its upper portion, means forming a part of the closure body constituting a whistle, means forming a gas escape passage leading from the interior of the cell to the whistle through which gases formed during charging of the cell may pass, a weighted closure means for the passage which, when operative, may be shifted to open the passage by the development of sufficient gas pressure within the cell, and float actuated means so constructed and arranged as to prevent said closure means closing the passage when electrolyte in the cell is at a predetermined height and above a predetermined specific gravity.

4. In a storage battery having an electrolyte containing cell provided with a top having a filling opening, a signaling device comprising a hollow body having an end formed to be secured in said opening, a member in the said end of the body having a passage therethru for the escape into the body of gases developed in the cell in charging the same, the inner end of the passage being of enlarged diameter, said member at its inner end having a pocket into the center of which the enlarged end of the passage opens, a ball valve in said pocket and adapted to enter by gravity into the said enlarged end of the passage, the ball when in the passage resisting the escape of gases from the cell, means forming a part of the body whereby gases escaping thru said passage past said valve will effect production of an audible signal, a float adapted to be floated by the electrolyte when the specific gravity reaches a predetermined figure, and a stem carried by the float and having an end extending into said passage and terminating in the enlarged end thereof, said stem operating when the float is raised by the electrolyte to shift the ball valve to open the passage.

5. In a storage battery having an electrolyte containing cell provided with a top wall having a filling opening, a removable closure for the filling opening, said closure having a gas escape passageway therethru leading from the interior of the cell, signaling means carried by the closure, a gravity controlled element adapted to close said passageway and to be shifted by the pressure of gases developed in the cell as a result of the charging of the same, the said gases, when under sufficiently developed pressure to force the element from the passageway closing position, effecting the operation of the signaling means, a float adapted to be raised by the electrolyte in the cell when the electrolyte specific gravity reaches a predetermined value, and means connected with the float for effecting the movement of said element from the passageway closing position when the electrolyte level is at a predetermined height and the specific gravity is at said value.

6. In a secondary battery having an electrolyte containing cell provided with a top wall having a filling opening normally closed by a plug, a body consisting of a hollow member having one end adapted to be secured in said opening, the other end of the member being closed, means forming a gas escape passage thru said one end of the member, a ball valve adapted to seat in the upper end of said passage, said ball valve being gravity operated to close the passage when the electrolyte level is low or its specific gravity is below a predetermined degree, the gases developed in the cell in the process of charging shifting the valve and passing into said member, means forming a part of the member by which the gases pass to the outside thereof whereby such gases escaping past said valve into the member will produce an audible signal, a float body contacting the electrolyte and raised thereby when the specific gravity exceeds a predetermined figure, a stem having one end extended into said passage and adapted when raised to a predetermined position with and by the float to lift said ball valve to open the passage, and the other end of the stem being connected to the float.

7. A signal device for a secondary battery, comprising a hollow body having an outlet opening, means for securing the body in an opening in the top of a battery cell with the outlet opening above the cell top, the body having a passage arranged to lead thereinto from inside the cell, a float member designed to be supported by the cell electrolyte when the latter has a specific gravity above a predetermined figure, a stem carried by the float and having an end extended into said passage, a gravity-actuated valve element adapted to close the passage when the stem and float are lowered a predetermined distance to confine gases developed in charging the cell whereby pressure is built up beneath the element, means in the body co-acting with the outlet opening to effect development of a signaling sound when a volume of gas passes rapidly thru the passage, the body and the outlet opening, and said stem being of the necessary length to engage and prevent the valve closing the passage when raised with the float as the latter is raised to the top of the electrolyte when the electrolyte is at a predetermined level and has the said predetermined specific gravity.

ELTON L. WILLITS.